United States Patent Office

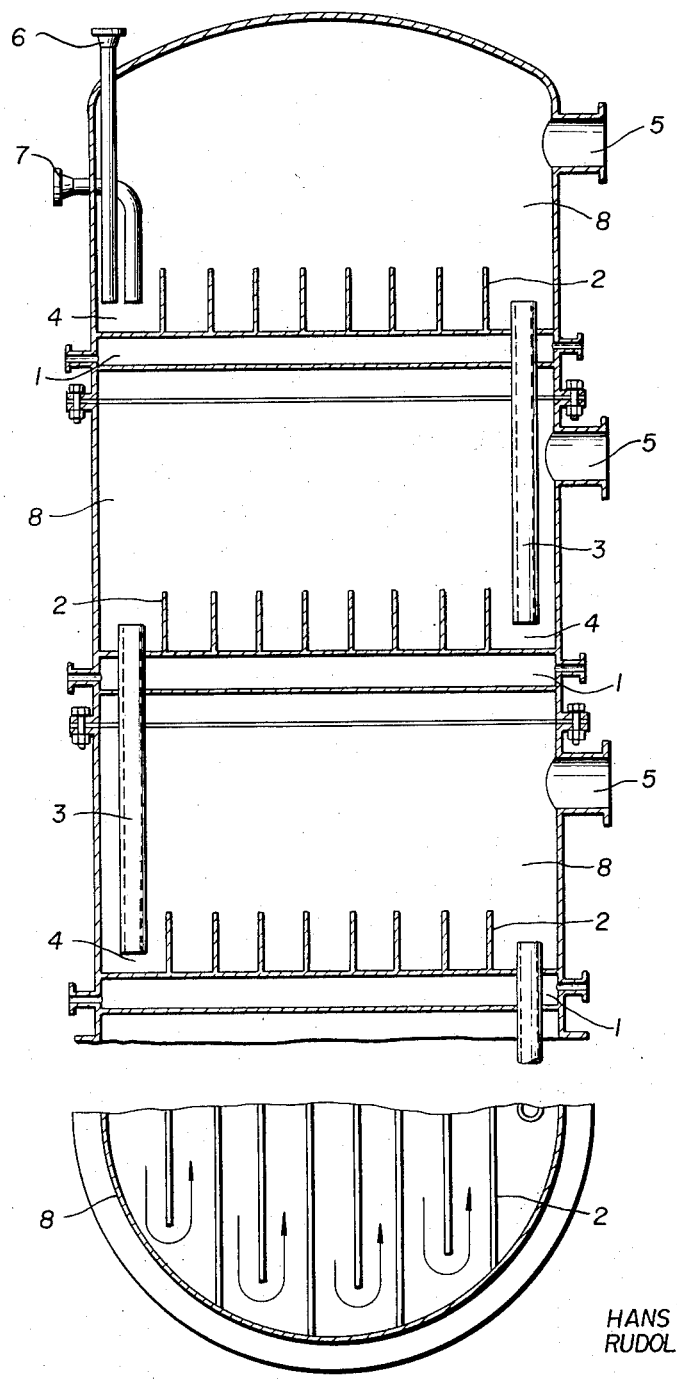

3,823,207
Patented July 9, 1974

3,823,207
PROCESS FOR THE PREPARATION OF
TRIARYLPHOSPHITES
Hans Bernhard Herzog, Bensheim-Auerbach, and Rudolf
Hoppe, Bensheim, Germany, assignors to Ciba-Geigy
AG, Basel, Switzerland
Filed Feb. 4, 1971, Ser. No. 112,738
Claims priority, application Germany, Feb. 17, 1970,
P 20 07 070.6
Int. Cl. C07f 9/08
U.S. Cl. 260—976        8 Claims

ABSTRACT OF THE DISCLOSURE

Process for the preparation of triarylphosphites from phenols and phosphorous trichloride wherein the reaction occurs separately in three stages in consecutively connected reaction zones, each succeeding stage having a lower pressure and higher temperature than the preceding stage. The invention also provides for an apparatus for effecting the above reaction comprising a reaction vessel in the form of a column with consecutively connected reaction trays capable of being heated.

---

The present invention relates to a process and an apparatus for the preparation of triarylphosphites.

Triarylphosphites and also aryl-alkylphosphites and/or trialkylphosphites obtained therefrom through trans-esterification are widely employed as stabilizers in the synthetic resin and rubber industries. Their action in this connection is that of thermostabilizers, antioxidizing agents and complex-forming agents. Furthermore, the materials are employed as modifiers in the production of epoxy resin. Thus, the demand for triarylphosphites grows with the increasing employment of synthetic resins.

Industrially, triarylphosphites are manufactured ordinarily through the reaction of possibly substituted phenols with phosphorus trichloride. Here, the liquid phenol is placed into a stirrer vessel and phosphorous trichloride is introduced for the reaction. The reaction ends in three hours; monoaryloxy-dichloro-phosphine being formed first, then diaryloxy-monochloro-phosphine and, finally, triarylphosphite (triaryloxyphosphine). Everyone of the three reactions is weakly exothermic in association with the release of hydrogen chloride whose heat of vaporization, however, is greater than the reaction heat of the three reaction stages, so that heat must be provided. Accordingly, the reactor is heated. The first two reaction stages run off approximately at the rate of ion reactions while the last stage forms an equilibrium that can be explained on the basis of the most simple triarylphosphite as follows:

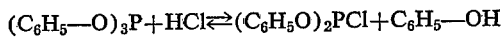

As evident from the equation, hydrogen chloride must be removed from the reactive mixture, in order to obtain pure triarylphosphite. Frequently it is advantageous in this connection to perform the reaction with an excess of phenol.

This reaction of phenols with phosphorus trichloride cannot be accelerated as desired through a stronger heating or through a more rapid introduction of the feed materials. On the one hand, the vaporization losses of phosphorus trichloride and the yield losses thus resulting must be avoided. On the other hand, foaming occurs in the reaction vessel when the rate of feed is too high.

The local supersaturation at the beginning of the reaction and the slower speed of the reaction after the formation of diaryloxy-monochloro-phosphines cause increased losses of phosphorus trichloride. The hydrogen chloride acting as the carrier gas also exerts a decisive influence on the losses.

Likewise, the foaming exerts a very disadvantageous effect on the admission time of the phosphorus trichloride. In the case of operational batches of the order of several tons, in an ordinary reaction vessel, the surface/volume ratio is already so unfavorable that the rate of admission must be reduced to one-tenth and less of the possible reaction rate. As already stated, the hydrogen chloride must be removed completely at the end of the reaction in order to shift the equilibrium to the side of trialkylphosphites. This is attained by increasing the temperature and through vacuum. Also in this reaction stage, the foaming prevents an uninterrupted run owing to the unfavorable surface/volume ratio.

In the case of operations with, e.g., a 3.6 tons output of triphenylphosphite, the residence time in an ordinary reactor amounts to 11 hours without the subsequent distillatory removal of the excess phenol. Here, the feed time for liquid phenol amounts to 0.5 hours, the feed time of phosphorus trichloride to 9 hours and the after-reaction period without the introduction of the phosphorus trichloride feed amounts to 1.5 hours (See Example 1). Larger batches increase the duration of the reaction considerably beyond the above values since the surface becomes even more unfavorable in comparison to the volume.

It has now been found that with the process to be described below, the residence time can be reduced unexpectedly to one hour and the production in a reaction apparatus can be increased to a multiple of the tonnage as compared to the charge production with the capacities limited for the reasons stated above.

The above advantages are attained by means of a reaction column with consecutively connected trays that are connected in series, individually or as a group and which always permit the consecutive performance of one of the three reaction stages at different conditions of temperature and pressure with the special arrangement of the column sections. This can be seen by a consideration of the apparatus as set forth in the drawing. Every column portion is provided with a steam- or warm-water-heated double jacket bottom (1).

Perdendicular walls (2) are placed on the trays so that the reaction solution can flow along only such paths thus prescribed up to an overflow (3), which is led through the double jacket as a pipe, on the side of the column bottom, as illustrated, or it can also be placed outside of the column so as to lead to the following column section.

The solution flows through the overflow to the start of the following reaction path (4), which start is shifted by 180° in relation to the preceding tray. The height of overflow (3) and the height of partitions (2) differ at least by the height of the foam so as to prevent a free overflow from input (4) directly to overflow (3).

However, the guiding walls of the trays are kept low with advantage and should not exceed the height of 20 cm. so as to provide the possibility of short column sections.

Column section (8) are provided with sufficiently wide outlets (5) for the discharge of hydrogen chloride, at a sufficient distance from the reaction tray and above the end of the connection leading from the overflow (3).

The individual reaction zones consisting of a tray or a plurality of trays differ through the different periods of stay, temperatures and pressures. Phenol and phosphorus trichloride are added only to the first zone of reaction. The feed of phenol (6) is preferably liquid, that of phosphorus trichloride (7) is gaseous or liquid. The starting materials are added preferably at the start or also repeatedly in the first zone of reaction.

Excess of phenol possibly present and solvent are removed from the triarylphosphite in a fourth zone at an increased temperature and an additionally reduced pressure.

After a reading of indicators in situ or of remote indicators, the temperature and pressure adjustment of separate zones can be regulated by hand or preferably by means of control circuits. This is true also for the control addition of phenol and phosphorus trichloride. The overflow between tray bottoms of different pressure is regulated by means of a level control.

The height of the foam layer on the reaction solution is a function of the throughput and of the phenol employed. If hydrogen on the phenol nucleus is substituted singly or multiply by alkyl or aryl radicals, the tendency to increased foaming occurs. This is true also for the increasing chain length of the substituents.

Now it has also been found that the foaming can be very much reduced by the addition of an inert organic solvent to the reaction solution. In this connection, amounts of 15–30 percent are already sufficient in the case of substituted phenols for lowering the foaming to the value of the phenol proper, exhibiting the lowest foaming tendency or even beyond such a value. Advantageously, the boiling point of the inert solvent is so selected that the excess phenol possibly present may be removed by distillation together with the solvent at the end of the reaction.

The described apparatus for the realization of the process, advantageously designed as a column, can also be designed in a more expensive manner so as to consist of separate sections connected in series.

The hydrogen chloride removed from the separate reaction zones with different vacuum pressures, after equalization to normal pressure or slightly above normal and prior to neutralization or absorption, is treated advantageously with phenol in order to remove and to recover residues of phosphorus trichloride and, possibly, solvent from the gas. For such a purpose, the hydrogen chloride preferably flows in a trickling column against the phenol intended for the trans-esterification to triarylphosphite. In this connection, the phosphorus trichloride contained in the exhaust gas is absorbed quantitatively in a prereaction by the phenol flowing in a large excess over the trays or filling material.

Example 1 (Comparative example)

Into a 4 m.$^3$ enameled stirrer vessel, 3680 kg. phenol are pumped at temperatures above 45° C. After approximately 30 minutes, the admission of totally 1650 kg. phosphorus trichloride is started. The temperature is maintained at 60° C. and phosphorus trichloride is added at normal pressure, with the stirrer running, to the extent permitted by the foaming in the reactor and by the analysis of the phosphorus trichloride in the discharged hydrogen chloride. The feed is completed after 9 hours. The temperature is increased to 75° C. and the after-reaction is performed for 2 hours. Subsequently, vacuum is applied slowly until a pressure of 3 mm. Hg is finally attained. The temperature in this connection is increased slowly to 160° C. The lowering of the pressure and the increase of the temperature are again effected to the extent permitted by the foaming in the reactor. After 12 hours, the distillation connected with the after-reaction under vacuum is completed. The total reaction time amounts to about 14 hours, the time of stay or residence time up to the completed distillation to about 24 hours. The yield in relation to phosphorus trichloride amounts to 91% and 3500 kg. triphenylphosphite were obtained.

Example 2

Into a column with 20 trays of 600 mm. diameter, whose sections are designed in accordance with the description and the drawings, 494 kg./h. phenol are added at the start of the reaction path of tray 1 and 71.6 kg./h. of phosphorus trichloride are added at the start of the reaction paths of trays 1, 3 and 5. The height of the guide plates of the trays is 200 mm. and the height of the overflow 100 mm. The width of the connection for the escaping hydrogen chloride is 200 mm. and it is arranged 200 mm. above the trays laterally on the column section whose total height amounts to 500 mm. All together, there are 6 sections arranged for the first reaction stage that is to be operated at 60° C. and at normal pressure.

The reaction solution flows level-regulated into the second stage consisting of 4 sections, which stage is operated at 90° C. and 400 mm. Hg pressure. From there, the solution flows into the third stage, consisting of 6 sections and operated at 120° C. and 200 mm. Hg pressure. The solution flows level-regulated into the fourth stage, consisting of four sections and operated at 170° C. and 3 mm. Hg pressure, for the distillation of excess phenol. The total time of stay amounts to one hour. The yield is 99%, in relation to the phosphorus trichloride, in the case when the feed phenol is pre-reacted with the gaseous phosphorus trichloride discharged together with the hydrogen chloride. In 24 hours, 12,000 kg. of triphenylphosphite are obtained.

Example 3

In accordance with Example 2, 465 kg./h. of nonylphenol and 102 kg./h. of phosphorus trichloride are applied to the column so as to obtain a flow of 500 kg./h. trinonylphosphite. The foaming is so strong that the solution runs out from the gas outlets together with hydrogen chloride.

The reaction can be rendered possible only by reducing the flow to 55%. The time of stay amounts to 1.8 hour and the production to 6,600 kg. in 24 hours. The yield in relation to phosphorus trichloride amounts to 88% when the feed phenol is pre-reacted with the PCl$_3$ contained in the exhaust gas.

Example 4

The feed is the same as in the first portion of Example 3 but with a 20% addition of a white spirit (boiling limits 160–185° C., density 0.78). The phenol feed amounts to 465 kg./h. and the phosphorus trichloride feed to 92 kg./h. In relation to Example 2, reaction stages 1–3 are shortened by a total of 3 trays, stage 4 is made higher to a corresponding extent. The profiles of temperature and pressure correspond to Example 2. The time of stay amounts to 50 minutes. In 24 hours, 12,000 kg. of trinonylphosphite are obtained. The yield in relation to phosphorus trichloride amounts to 98% when the nonylphenol is pre-reacted with the gaseous PCl$_3$, discharged together with the hydrogen chloride and the nonylphenol.

As pointed out previously, the pressures and temperatures in the various reaction zones should be arranged so that the each succeeding stage or zone has a lower pressure and a higher temperature than each preceding stage. For example, the pressure in the first zone is about 760 mm. Hg and the temperature should be about 20° C. to about 70° C. and preferably about 40° C. to about 60° C. The pressure in the second zone should be about 200–500 mm. Hg, preferably 300 mm. to about 400 mm. and the temperature should be between about 70–120° C. and preferably between 90° C. and 100° C. The pressure in the third zone should be between about 10–300 mm. Hg and preferably between about 20–200 mm., whereas the temperature in the zone should be about 110–150° C. and preferably between about 120° C.–140° C. The pressures and temperatures in the fourth zone used to remove the excess phenol and solvent in the reaction solution by distillation is about 2–3 mm. Hg and the temperature is between about 140–180° C. and preferably between about 150°–170° C.

The inert organic solvents used to reduce the foaming may be selected from aliphatic or aromatic hydrocarbons in the boiling range of the phenols, for example, from about 150° to 250° C. Suitable solvents may be represented by white spirit, ligroin, mineral spirit or other mineral oils or petroleum fractions. Such solvents should not react with the phosphorous trichloride.

The height of the liquid phase in the trays should not exceed 20 cm., preferably no more than 15 cm. The perpendicular partitions or walls of the reaction trays should be at most about 10 cm. higher than the liquid layer to make room for the foam layer and preferably should be only about 5 cm. higher.

The total height of the liquid plus the partition above the liquid is therefore preferably about 20 cm. The overflow then has a height of about 10–15 cm.

We claim:

1. In a process for the preparation of triaryl phosphites from phenols and phosphorous trichloride, by reacting the phenols and phosphorous trichloride to produce the objective triaryl phosphites, the improvement which comprises reacting the phosphorous trichlorides and phenols in three consecutively interconnected reaction zones which differ from each other in that each succeeding zone has a lower pressure and a higher temperature than the preceding zone, such that the pressure in the first zone is 760 mm. Hg, and the temperature is about 20°–70° C.; the pressure in the second zone is between about 200–500 mm. Hg and the temperature is about 70°–120° C., and the pressure in the third zone is about 10–300 mm. Hg and the temperature is between about 110–150° C.

2. The improvement according to claim 1 wherein the temperature in the first zone is between about 40° to 60° C.; the temperature in the second zone is between about 90°–110° C. and the temperature in the third zone is between about 120–140° C.

3. The improvement according to claim 1 wherein any excess phenol and solvent present in the reaction solution are removed by distillation in a fourth consecutive and interconnected zone at an additionally increased temperature and at a lower pressure.

4. The improvement according to claim 3 wherein the pressure in the fourth zone is between about 2–3 mm. Hg and the temperature is between about 140°–180° C.

5. The improvement according to claim 1 wherein hydrogen chloride gas is removed from each reaction zone through outlet means provided therein.

6. The improvement according to claim 5 wherein residual amounts of phosphorous trichloride contained in the out-flowing reaction hydrogen chloride gas are reacted with the phenol introduced into the system.

7. The improvement according to claim 1 wherein an inert solvent is added to the reaction solution to reduce the foaming which occurs in the reaction.

8. The improvement according to claim 7 wherein the inert organic solvent is selected from the group consisting of aliphatic or aromatic hydrocarbons having a boiling point of from 150° C. to 250° C.

References Cited

UNITED STATES PATENTS 2,193,252   3/1940   Kyrides ---------- 260—976 X
2,730,541   1/1956   Dye -------------- 260—976

ANTON H. SUTTO, Primary Examiner

U.S. Cl. X.R.

23—263 A, 283 C; 260—966